US006615313B2

United States Patent
Kato et al.

(10) Patent No.: US 6,615,313 B2
(45) Date of Patent: Sep. 2, 2003

(54) DISK INPUT/OUTPUT CONTROL DEVICE MAINTAINING WRITE DATA IN MULTIPLE CACHE MEMORY MODULES AND METHOD AND MEDIUM THEREOF

(75) Inventors: Tadaomi Kato, Yokohama (JP); Hideaki Omura, Kawasaki (JP); Hiromi Kubota, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 252 days.

(21) Appl. No.: 09/779,845

(22) Filed: Feb. 9, 2001

(65) Prior Publication Data

US 2001/0049768 A1 Dec. 6, 2001

(30) Foreign Application Priority Data

Jun. 5, 2000 (JP) .......................................... 2000-167483

(51) Int. Cl.[7] .............................................. G06F 12/00
(52) U.S. Cl. ........................ 711/113; 711/114; 711/154; 711/170
(58) Field of Search ........................ 711/111, 112, 113, 711/114, 118, 122, 141, 153, 154, 170, 171, 172, 173

(56) References Cited

U.S. PATENT DOCUMENTS

| 5,412,668 A | * | 5/1995 | Dewey .......................... 714/766 |
| 5,615,329 A | * | 3/1997 | Kern et al. ....................... 714/6 |
| 5,917,999 A | * | 6/1999 | Yamamoto et al. ............. 714/6 |
| 6,041,396 A | * | 3/2000 | Widigen ........................ 711/206 |
| 6,341,331 B1 | * | 1/2002 | McNutt ......................... 711/113 |
| 6,457,098 B1 | * | 9/2002 | DeKoning et al. ............ 711/114 |
| 6,460,122 B1 | * | 10/2002 | Otterness et al. ............. 711/154 |

FOREIGN PATENT DOCUMENTS

| JP | 7-281959 | 10/1995 |
| JP | 8-087450 | 4/1996 |
| JP | 10-074129 | 3/1998 |

* cited by examiner

*Primary Examiner*—Do Hyun Yoo
*Assistant Examiner*—Christian P. Chace
(74) *Attorney, Agent, or Firm*—Staas & Halsey LLP

(57) ABSTRACT

An input/output control device uses all of its cache memory effectively and allows cache memory modules to be added in increments of one. When cache memory included in the input/output control device is operating normally and the input/output control device receives a write request from a processing device, the input/output control device returns a write request completed response after writing data to cache memory as set forth in configuration information included in the input/output control device. The write data in the cache memory is then written to one or more disk devices asynchronously with the write completed response. When there is a problem with a cache memory module, the write data that was to be written to the region controlled by the cache memory module where the problem occurred is divided among the remaining cache memory modules. When adding more cache memory modules, the input/output control device writes data to the cache memory in response to a write request from a processing device based on the configuration information after the cache memory was increased and after the data was moved as set forth in the configuration information corresponding to the cache memory increase.

25 Claims, 11 Drawing Sheets

CONFIGURATION INFORMATION

| DISK CON- TROLLED REGION | CACHE MEMORY 1-1 | | CACHE MEMORY 1-2 | | .... | CACHE MEMORY 1-n | | CACHE MEMORY 1-(n+1) | |
|---|---|---|---|---|---|---|---|---|---|
| | PRIMARY DATA | SECONDARY DATA | PRIMARY DATA | SECONDARY DATA | .... | PRIMARY DATA | SECONDARY DATA | PRIMARY DATA | SECONDARY DATA |
| ⟨NORMAL OPERATION⟩ | | | | | | | | | |
| | R1 | Rn | R2 | R1 | .... | Rn | Rn-1 | | |
| ⟨PROBLEM OPERATION⟩ | | | | | | | | | |
| | PROBLEM | | R'1 | R'n | .... | R'n | R'n-1 | | |
| | R'1 | R'n | PROBLEM | | | R'n | R'n-1 | | |
| | ⋮ | | ⋮ | | | ⋮ | | | |
| | | | | | | PROBLEM | | | |
| ⟨CACHE MEMORY INCREASE⟩ | | | | | | | | | |
| | R''1 | R''n+1 | R''2 | R''1 | .... | R''n | R''n-1 | R''n+1 | R''n |

CONFIGURATION INFORMATION

| SUPERVISORY LOGICAL VOLUME | CACHE MEMORY 12d-1 | | CACHE MEMORY 12d-2 | | CACHE MEMORY 12d-3 | |
|---|---|---|---|---|---|---|
| | PRIMARY DATA | SECONDARY DATA | PRIMARY DATA | SECONDARY DATA | PRIMARY DATA | SECONDARY DATA |
| | 1~10 | 21~30 | 11~20 | 1~10 | 21~30 | 11~20 |
| | WHEN PROBLEM OCCURS | | | | | |
| | 1~10 | 11~30 | 1~20 | 21~30 | 21~30 | 1~20 |
| | | | WHEN PROBLEM OCCURS | | | |
| | 1~10,21~30 | 11~20 | 11~20 | 1~10,21~30 | 11~30 | 1~10 |
| | | | | | WHEN PROBLEM OCCURS | |

DISK INPUT/OUTPUT CONTROL DEVICE MAINTAINING WRITE DATA IN MULTIPLE CACHE MEMORY MODULES AND METHOD AND MEDIUM THEREOF

CROSS REFERENCE TO RELATED APPLICATIONS

The contents of 2000-167483, filed Jun. 5, 2000 in Japan, are incorporated herein by reference.

BACKGROUND OF THE INVENTION

1. Field of the Invention

The present invention relates to an input/output control device for disks, and, more particularly, to an input/output control device that maintains write data in multiple cache memory modules.

2. Description of the Related Art

RAID control devices typically include cache memory. In response to a write request received from a server, the RAID control devices return a write request complete response to the server just by writing the data to the cache memory. The write data stored in the cache memory is written to disk devices asynchronously to the write complete response sent to the server. This type of operation is called a write back operation. The response time of a disk device that uses a cache memory to perform a write back operation in response to a write request is many times (approximately 10 times) shorter than disk devices that have no cache memory.

In order to guarantee permanence of the write data, RAID control devices normally have two cache memory modules and each cache memory module holds its own write data. The write data that is held in the two cache memory modules is referred to as primary data and secondary data below. By using this sort of configuration, even if there is a problem with one of the cache memory modules, the other cache memory module contains write data, so the write data will not be lost.

Normally, in order to guarantee the permanence of the write data, when there is a problem with the cache memory and there is only one cache memory, the write data stored in the cache memory is written back immediately to the disk. In this situation, the writing of the write data to the disk is synchronized and a write data complete response is returned to the server. This sort of operation is referred to as a write through operation. Switching from a write back operation to a write through operation when there is a problem with the cache memory requires a longer period of time (approximately 10 times) to respond to a write request.

One method considered as a countermeasure to the above loss of performance when shifting to a write through operation when having trouble with the cache memory is to prepare a spare cache memory to use when there are cache memory problems.

Figure 10A:
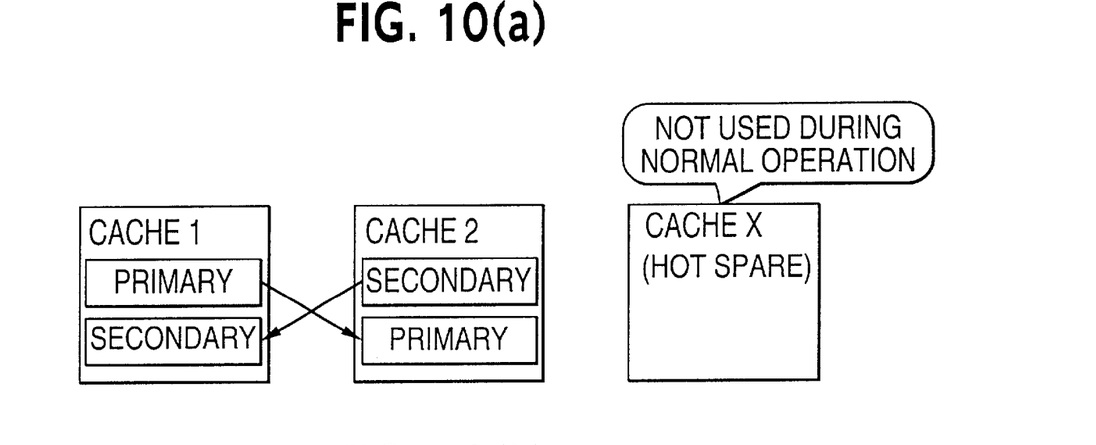
FIGS. 10(a) and 10(b) are diagrams showing the conventional hot spare system.

That is, in addition to two cache memories, Cache 1 102 and Cache 2 107, shown in FIG. 10(*a*), a spare cache memory, Cache X 106, which is not normally used, is prepared.

Figure 10B:
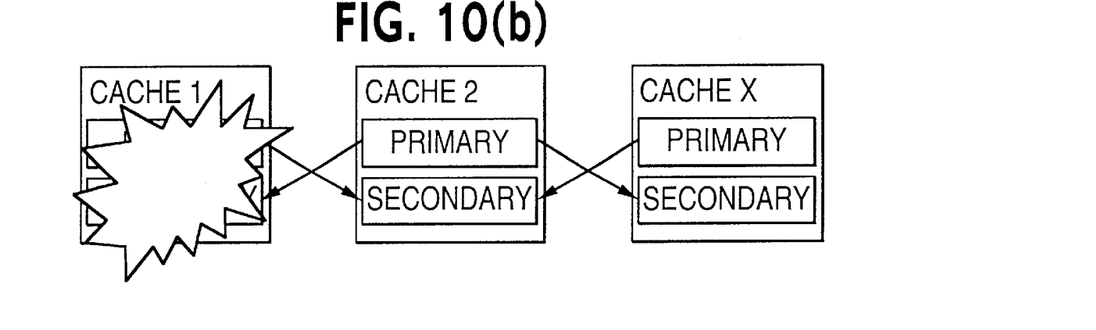

Then if, for instance, there is a problem with the cache memory Cache 1 102, the spare cache memory Cache X 106 can be used to hold the primary data and secondary data of the write data, as shown in FIG. 10(*b*). By using this sort of configuration, even if there are problems with the cache memory Cache 1 102 or Cache 2 107, the write back operation can be performed. The above system is referred to as a hot spare system 100.

Figure 11A:
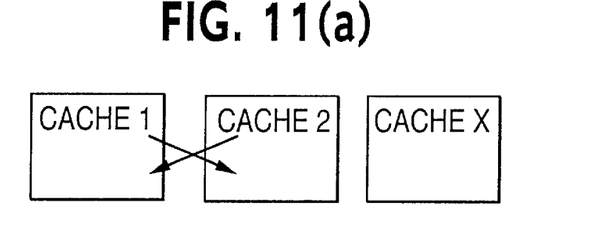
FIGS. 11(a) and 11(b) are diagrams showing the problems with the conventional hot spare system.

However, the aforementioned conventional methods have the following disadvantages:

(1) The hot spare system 100 requires that a cache memory module 106 be prepared that is normally not used, as shown in FIG. 11(*a*), so the cache memory cannot all be used effectively.

Figure 11B:
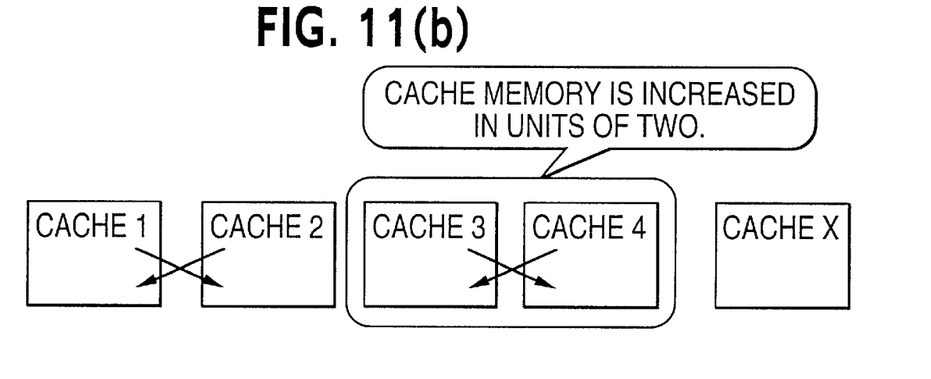

(2) To ensure the permanence of the write data, when using two cache memory modules 102, 107 as described above, the cache memory modules 110, 112 must always be increased in pairs 108 when expanding the cache memory as shown in FIG. 11(*b*). In addition, when using the hot spare system 100, a cache memory module 106 must be prepared that is normally not used.

SUMMARY OF THE INVENTION

An object of the present invention is to solve the above-mentioned problems.

Another object of the present invention is to provide an input/output control device that allows the effective use of all of the cache memory.

A further object of the present invention is to allow the amount of cache memory to be increased one cache memory module at a time.

The present invention comprises a computer system comprising an input/output control device coupled to one or more disk devices and coupled to and receiving a write request including data from a processing device. The input/output control device of the present invention comprises n (n>2) cache memory modules storing the data upon receiving the write request. The input/output control device transmits to the processing device a write request complete response, and, asynchronously with transmitting the write request complete response, stores the data from the cache memory modules to the one or more disk devices. The input/output control device divides the regions of the one or more disk devices into a number of n of the cache memory modules in accordance with configuration information and sets up the configuration information to allocate sequentially primary data and secondary data of the write data, which are written out to a $k^{th}$ region (k=1~n) of a disk device, to the $k^{th}$ cache memory module, and a non-$k^{th}$ cache memory module, respectively.

Moreover, the present invention comprises a method and a computer-readable medium which, when executed by a computer, causes the computer to execute the processes comprising storing in n (n>2) cache memory modules of an input/output control device data received in a write request from a processing device, transmitting by the input/output control device to the processing device a write request complete response, and, asynchronously with transmitting the write request complete response, storing the data from the cache memory modules to one or more disk devices, dividing by the input/output processing device the regions of the one or more disk devices into a number of n of the cache memory modules in accordance with configuration information, and modifying by the input/output control device the configuration information to allocate sequentially primary data and secondary data of the write data, which are written out to a $k^{th}$ region (k=1~n) of a disk device, to the $k^{th}$ cache memory module, and a non-$k^{th}$ cache memory module, respectively.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1A:
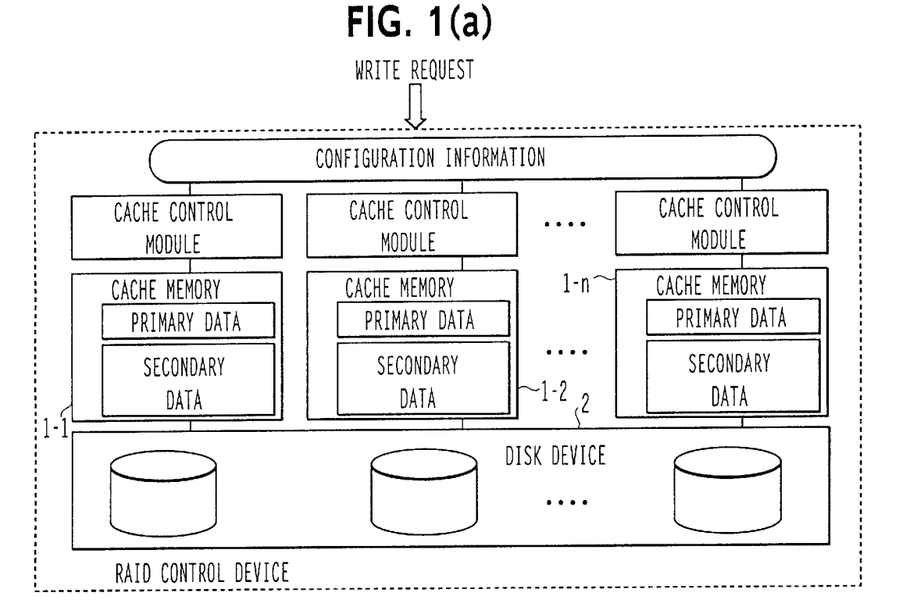
FIG. 1(a) is a digram showing an input/output control device of the present invention

FIG. 1(a) is a diagram showing an input/output control device 200 of the present invention. Input/output device 200 is also referred to as RAID (Redundant Array of Inexpensive Disks) control device 200.

Figure 1B:
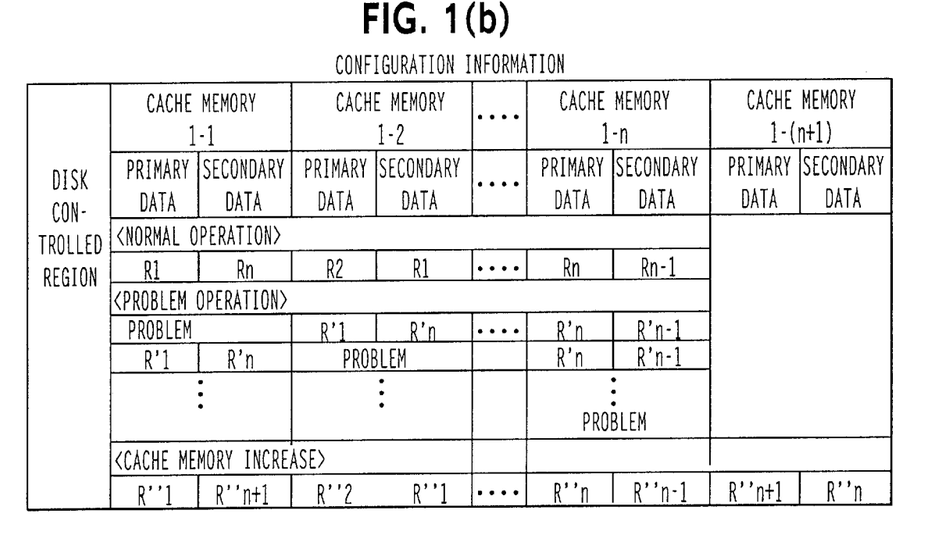
FIG. 1(b) shows an example of configuration information when the cache memory of the input/output control device of the present invention is functioning normally, is having problems, and when the cache memory is increased.

FIG. 1(b) shows an example of configuration information 202 when cache memory of the input/output control device 200 of the present invention is functioning normally, is having problems, and when the amount of cache memory is increased.

In FIG. 1(a), 1-1~1-n are the cache memory modules, referred to as cache memory 1. Each of the each cache memory modules 1-1~1-n duplicates and stores write data as primary data and secondary data. Moreover, the input/output device 200 of the present invention shown in FIG. 1(a) includes cache control modules 3-1, 3-2, . . . 3-n, each corresponding, respectively, to one of the cache memory modules 1-1, 1-2, . . . , 1-n.

When the cache memory 1 is functioning normally, as shown in the configuration information 202 corresponding to <NORMAL OPERATION> shown in FIG. 1(b), a region on one or more disks 2-1, 2-2, . . . , 2-q of disk device 2 is divided into the number of cache memory modules n. For instance, the write data (the primary data and the secondary data) that is written out to the $k^{th}$ (k=1~n−1) region Rk of the disk device 2 is held in the $k^{th}$ cache memory and the (k+1)th cache memory respectively, while the write data (the primary data and the secondary data) that is written out to the $n^{th}$ region Rn of the disk is held in the $n^{th}$ cache memory and the $1^{st}$ cache memory respectively.

Then, after the data has been written out to cache memory 1 as set forth in the above configuration information 202, a write request complete response is returned in response to the write request from the processing device (not shown in FIGS. 1(a) or 1(b)). The write data stored in the cache memory 1 is written out to one or more of the disk devices 2 asynchronously with the response that the write request complete response.

When there is a problem in the cache memory 1, the write data written out to the region supervising the cache memory that had the problem is taken over by the remaining cache memory.

As shown in the <PROBLEM OPERATION> section of the configuration information 202 shown in FIG. 1(b), the region of the one or more disk devices 2 is divided by the number of normal cache memory modules m (m<n). For example, the write data (the primary data and the secondary data) that is written out to the $k^{th}$ (k=1~m) region R'k of the disk device 2 is held in the $k^{th}$ cache memory and the (k+1)$^{th}$ cache memory respectively, while the write data (the primary data and the secondary data) that is written out to the $n^{th}$ region Rn of the disk is held in the $n^{th}$ cache memory and the $1^{st}$ cache memory respectively.

When a problem occurs in the cache memory 1, the secondary data corresponding to the primary data that was held in the cache memory 1 at the time of the problem is written immediately out to the disk device 2. Then, using the configuration information 202 at the time the problem occurred, the data is written into the cache memory 2 in response to a write request from the processing device and data is written out to the disk device 2 from the cache memory 1.

When increasing the amount of cache memory 1, the data held in the cache memory 1 is transferred as set forth in the configuration information 202 when the increase was made. Then, as shown in <CACHE MEMORY INCREASE> section of the configuration information 202 of the FIG. 1(b), after the increase, the configuration information 202 is used in response to the write request from the processing device to write the data from the cache memory 1 and the data is written out to the disk device from the cache memory 1.

As above, the input/output device 200 of the present invention circulates and holds duplicate write data in three or more cache memory modules 1. When there is a problem with one of the cache memory modules 1, the write data to be written to the region that is supervised by the cache memory 1 that had the problem is taken over by the remaining cache memory 1, providing for any configuration with n>2cache memory modules 1. There is also no need to prepare any more cache memory 1 than is normally used and all of the cache memory 1 is used effectively.

Embodiments of the Present Invention

Figure 2:
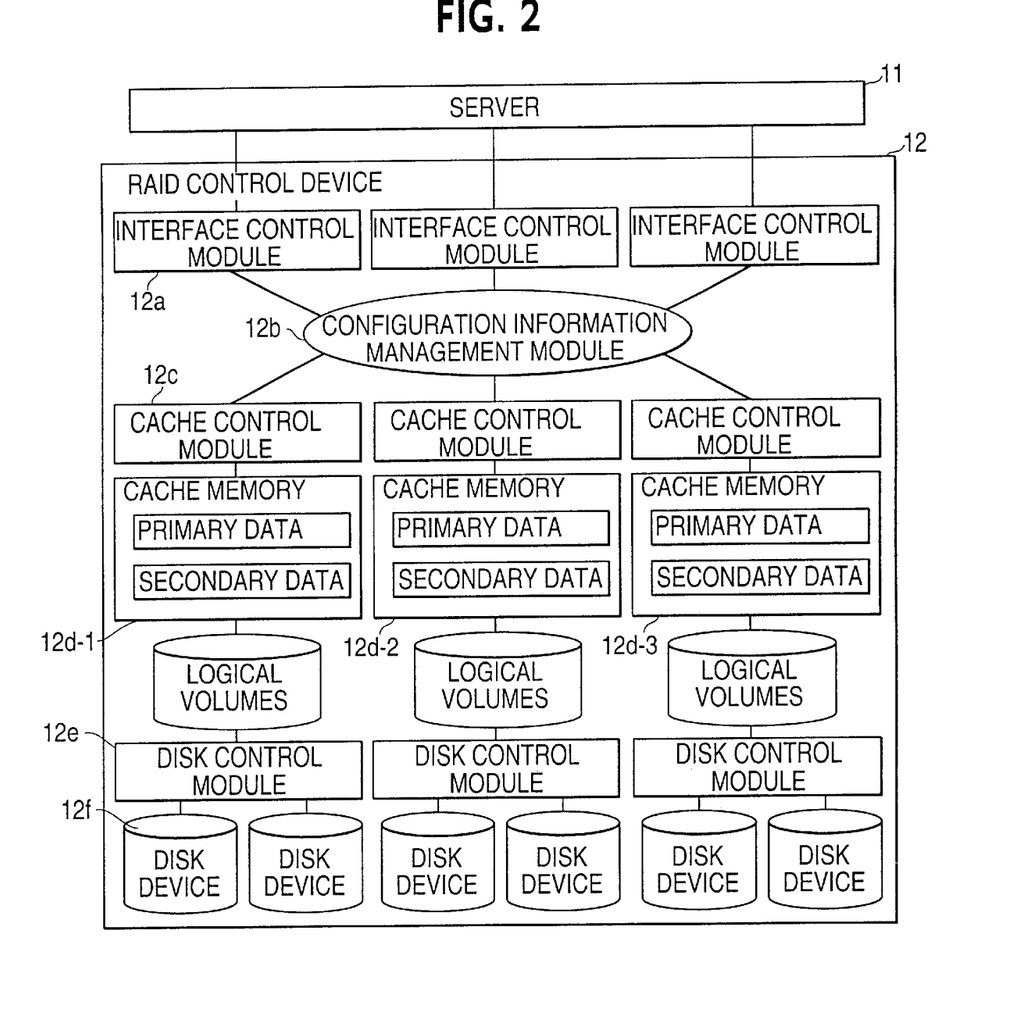
FIG. 2 is a diagram showing the overall configuration of the system of an embodiment of present invention.

FIG. 2 is a diagram of a computer system 300 of an embodiment of the present invention. As shown in FIG. 2, computer system 300 comprises server 11 and RAID control device 12. RAID control device 12 corresponds to RAID control device 200 shown in FIG. 1(a).

Server 11 transmits a write request to RAID control device 12 to write data from the server 11 to logical volumes 12g allocated among disk devices 12f by disk control module 12e.

As described above with respect to the RAID control device 200 shown in FIG. 1(a), when the write request is received from the server 11 to write data from the server 11 to the disk devices 12f, a write request complete response is returned to the server 11 upon writing the data to the cache memory 12d. The write data stored in the cache memory 12d is written out to the disk devices 12f asynchronously to the write complete response (write back operation).

The RAID control device 12 also comprises interface control module 12a, configuration information management module 12b, cache control module 12c, the cache memory 12d, and disk control module 12e that controls the disk and several disk devices 12f. The configuration information (corresponding to configuration information 202 shown in FIG. 1(b)) that keeps track of which cache memory 12d the write data from the server 11 is held in, is stored in the configuration information management module 12b.

Figure 3:
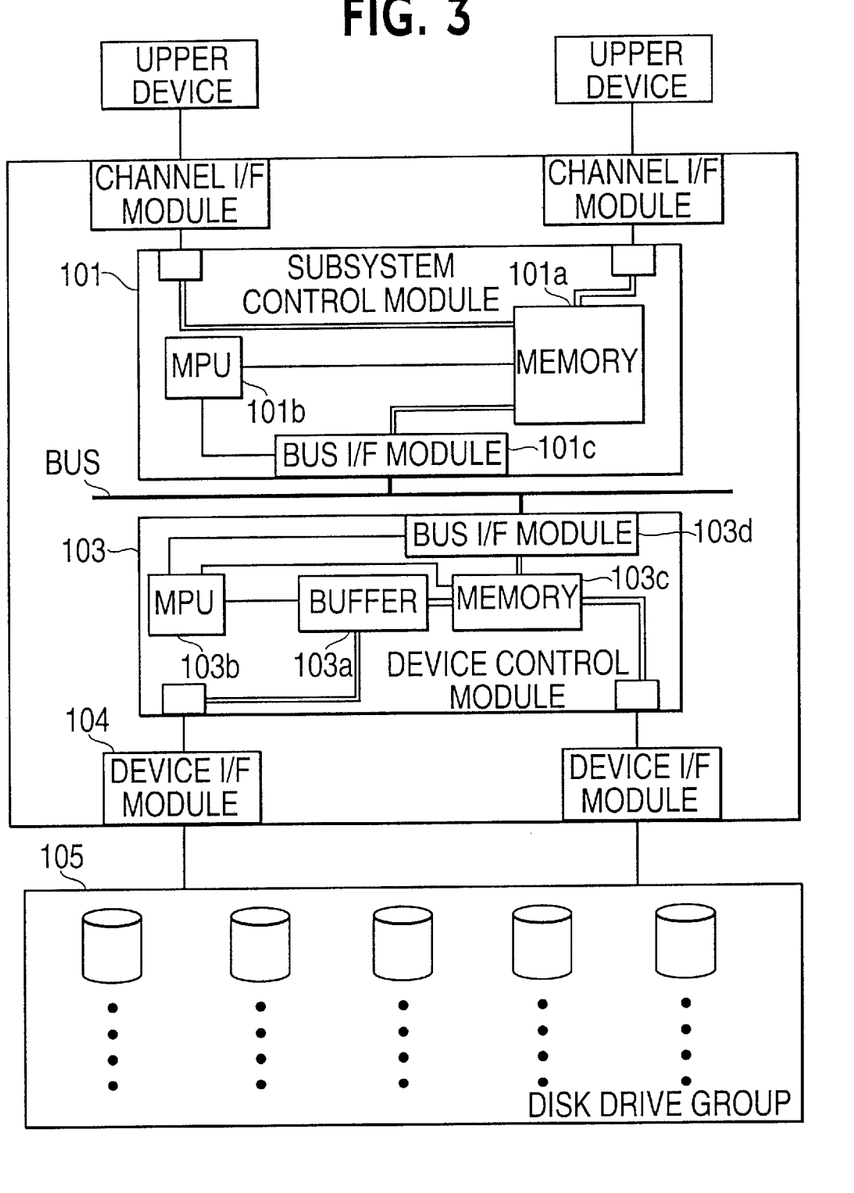
FIG. 3 is a diagram showing an example of the hardware configuration of the system of an embodiment of the present invention.

FIG. 3 shows a typical hardware configuration for a computer system 400 corresponding to the computer system 300 shown in FIG. 2.

In the computer system 400 shown in FIG. 3, the subsystem control module 101 is coupled to an upper device 116 by an I/F (interface) module 118, while the subsystem control module 101 comprises memory 101a, MPU 101b, and the bus interface module 10c. The above MP 101b operates according to a program stored in the memory 101a. In addition to the program, transfer data and control data are also stored in the memory 101a. The subsystem control module 101 shown in FIG. 3 comprises the cache memory 12d and the cache control module 12c shown in FIG. 2. The subsystem control module 101 in FIG. 3 corresponds to the section in the computer system 300 of FIG. 2 comprising the interface control module 12a, the configuration information management module 12b, the cache control module 12c, and the cache memory 12d.

Referring again to FIG. 3, device control module 103 comprises buffer 103a, MPU 103b, the memory 103c (which stores among other things, the program for running the aforementioned MPU 103b), and bus interface module 103d.

The above subsystem control module 101 and device control module 103 are connected by bus 120. The device control module 103 is connected to the disk drive group 105 by device I/F (interface) module 104. The device control module 103 shown in FIG. 3 corresponds to the disk control module 12e shown in FIG. 2.

In the embodiment of the computer system 400 of the present invention shown in FIG. 3, corresponding to the computer system 300 shown in FIG. 2, cache memory comprises the three cache memory modules 12d-1~12d-3 shown in FIG. 2. Each cache memory module 12d-1~12d-3 duplicates and stores the write data (received from upper device 116 corresponding to server 11) as primary data and secondary data.

The write data is to be written to disks 105-1, 105-2, 105-3, 105-4, . . . 105-x, of the disk drive group 105 shown in FIG. 3.

Figure 4:
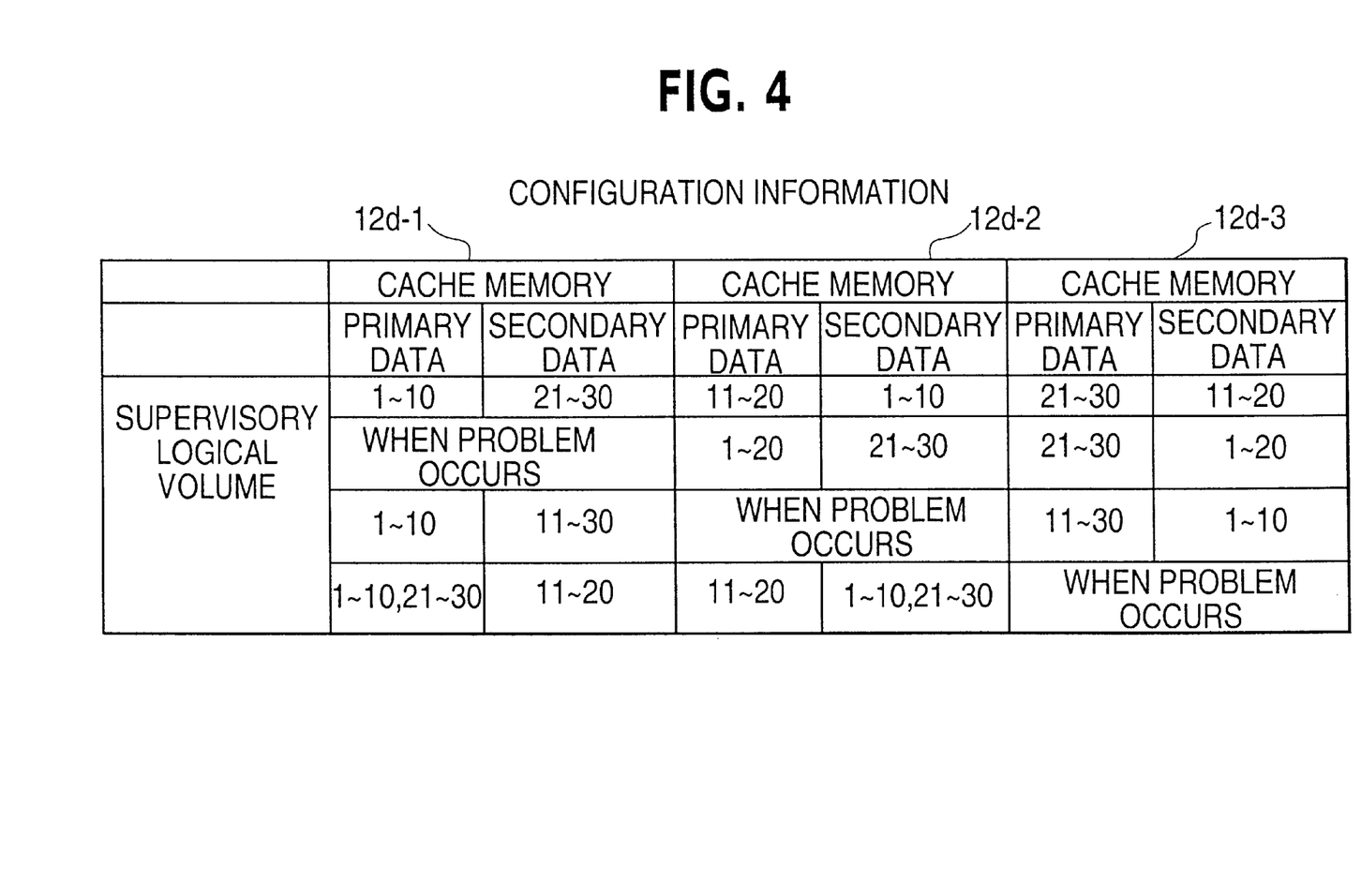
FIG. 4 is a diagram showing an example of the configuration information when there are three cache memory modules.

FIG. 4 shows an example of the configuration information 202 when there are three cache memory modules 12d-1, 12d-2, and 12d-3. Moreover, FIG. 4 indicates the supervisory logical volumes 12g corresponding to the primary data and the secondary data for each of the cache memory modules 12d-1, 12d-2, and 12d-3.

Figure 5A:
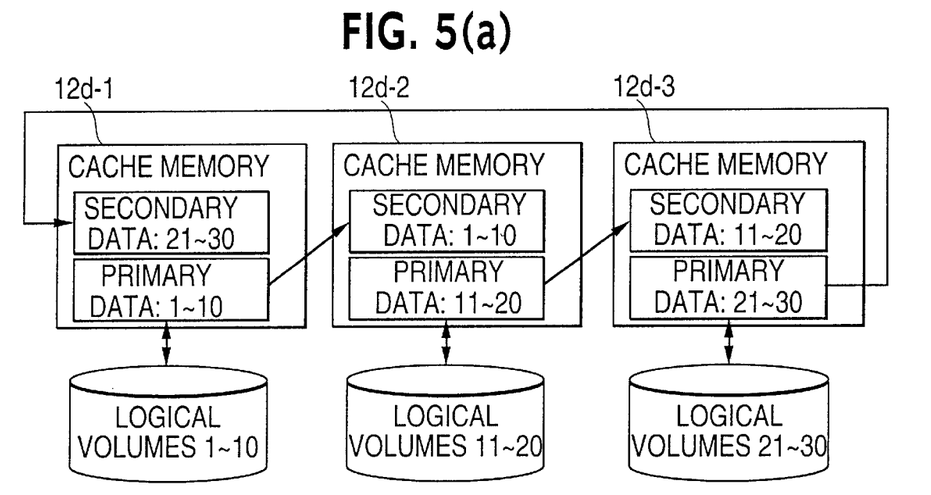
FIGS. 5(a) and (5b) are a diagram showing an example of the logical volumes supervised by the cache memory modules during normal operation and problem operation.
Figure 5B:
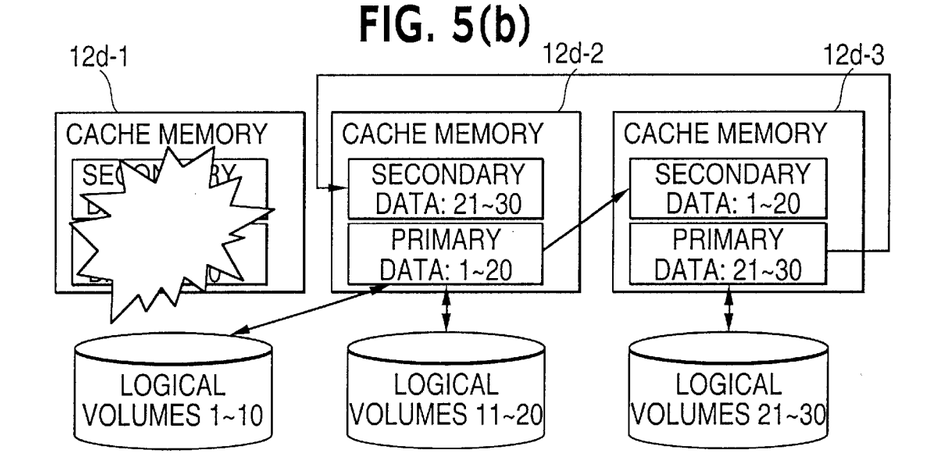

FIG. 5(a) shows the supervisory logical volume of each of the cache memory modules 12d-1, 12d-2, and 12d-3 during normal operation. FIG. 5(b) shows the supervisory logical volume 12g of each of the cache memory modules 12d-1, 12d-2, and 12d-3 when there is a problem with cache memory 12d.

As shown in FIG. 4 and FIG. 5(a) during normal operation, the supervisory logical volumes 12g of the cache memory module 12d-1 is 1~10 for the primary data and 21~30 for the secondary data, the supervisory logical volumes 12g of the cache memory 12d-2 is 11~20 for the primary data and 1~10 for the secondary data, the supervisory logical volumes 12g of the cache memory 12d-3 is 21~30 for the primary data and 11~20 for the secondary data.

In this state, if, for example, there were to be a problem on the cache memory 12d-1, based on the configuration information shown in FIG. 4, the supervisory logical volumes 12g in the cache memory modules 12d-1~12d-3 would change as shown in FIG. 5(b). The cache memory 12d-2 the supervisory logical volumes 12g would be 1~20 for the primary data, 21~30 for the secondary data while the supervisory logical volumes 12g for the cache memory 12d-3 would be 21~30 for the primary data and 1~20 for the secondary data.

That is, with three cache memory modules 12d-1, 12d-2, and 12d-3, the write data circulates between the three cache memory modules 12d-1, 12d-2, and 12d-3 while being duplicated. Therefore, when there is a problem with one of the cache memory modules (cache memory module 12d-1 in FIG. 5(b)), the logical volume that was in charge (that is, the supervisory logical volume) of the cache memory module (cache memory module 12d-1 in FIG. 5(b)) where the problem occurred would be shared among the remaining cache memory modules (cache memory modules 12d-2 and 12d-3 in FIG. 5(b)).

For this reason, the configuration information 202 defines the logical volume names of the primary data and secondary data that the cache memory supervises. Then, whenever there is a problem with one of the cache memory modules and the number of cache memory modules is reduced, each of the remaining cache memory modules re-defines the logical volume names of the primary data and secondary data that it supervises.

In the above example, there were three cache memory modules 12d-1, 12d-2, and 12d-3. Generally, however, the region of the one or more disks 105 would be divided into the number of cache memory modules (12d) n. The cache memory configuration information would be set up so that the write data (the primary data and the secondary data) to be written to the $k^{th}$ (k=1~n−1) region of the disk 105 would be held sequentially in the $k^{th}$ cache memory 12d and in the cache memory other than the $k^{th}$ respectively.

When a problem occurs, the configuration information 202 is set up as follows. The region of the one or more disks 105 is divided up into the number of normally functioning cache memory modules (12d) m (n<m). The primary data and the secondary data to be written to the $k^{th}$ (0<k≦m−1) region of the disk 105 are held sequentially in the $k^{th}$ cache memory 12d and in the cache memory that is not the $k^{th}$ cache memory 12d, respectively. This allows configurations of the computer system of the present invention with the desired number n (n≧3) of cache memory modules 12d. It is possible to increase the number of cache memory modules 12d during operation of the computer system of the present invention if this configuration information 202 is defined.

Figure 6:
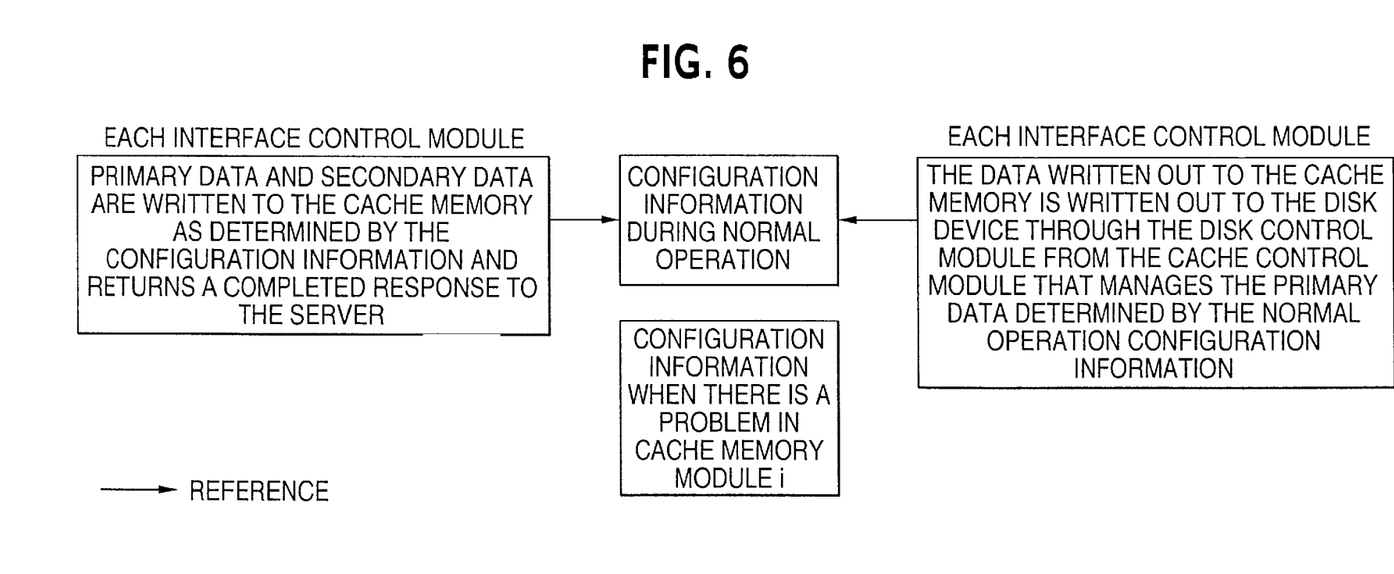
FIG. 6 is a diagram showing the process flow during normal operation of the cache memory.
Figure 7:
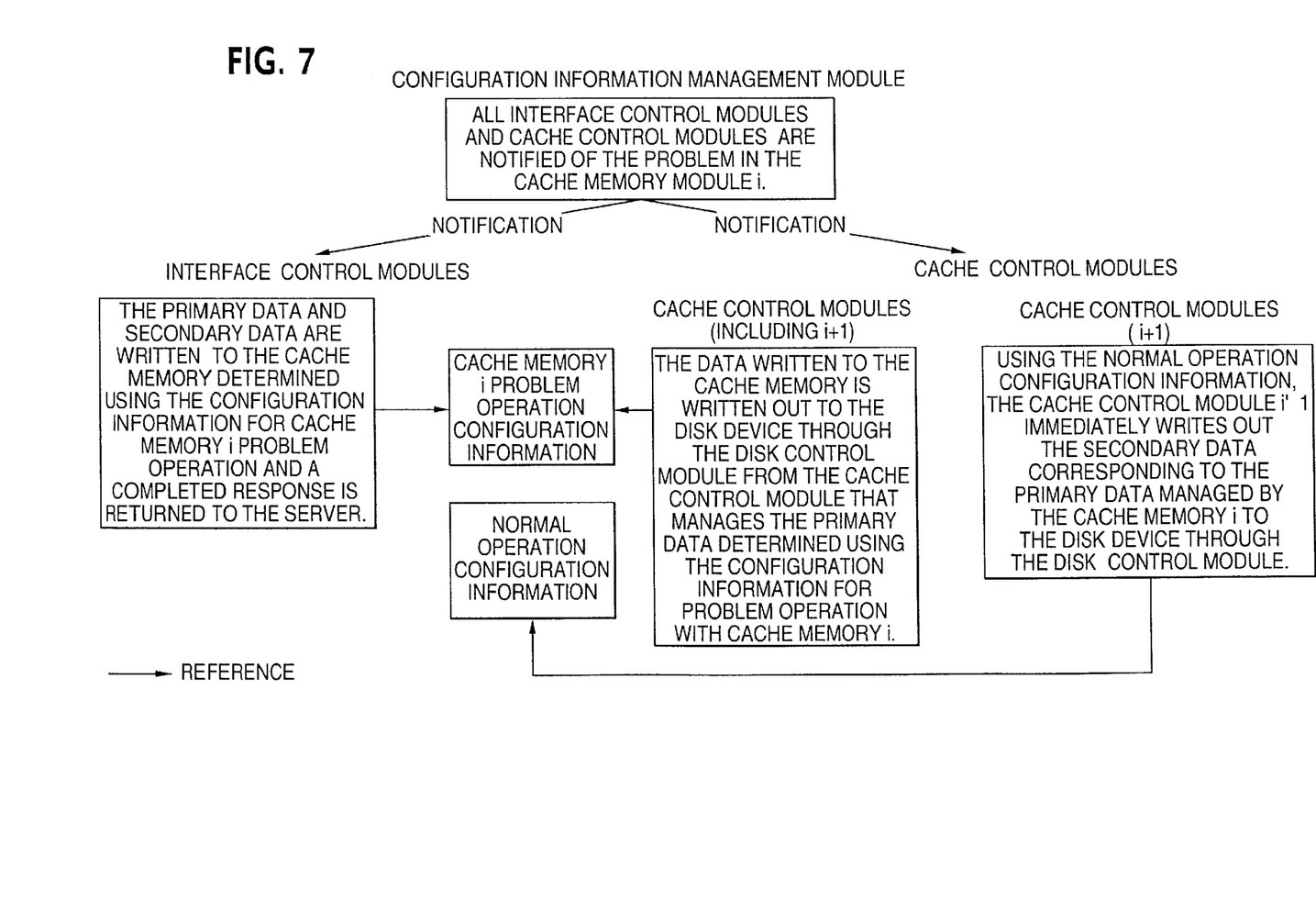
FIG. 7 is a diagram showing the process flow during problem operation of the cache memory.
Figure 8:
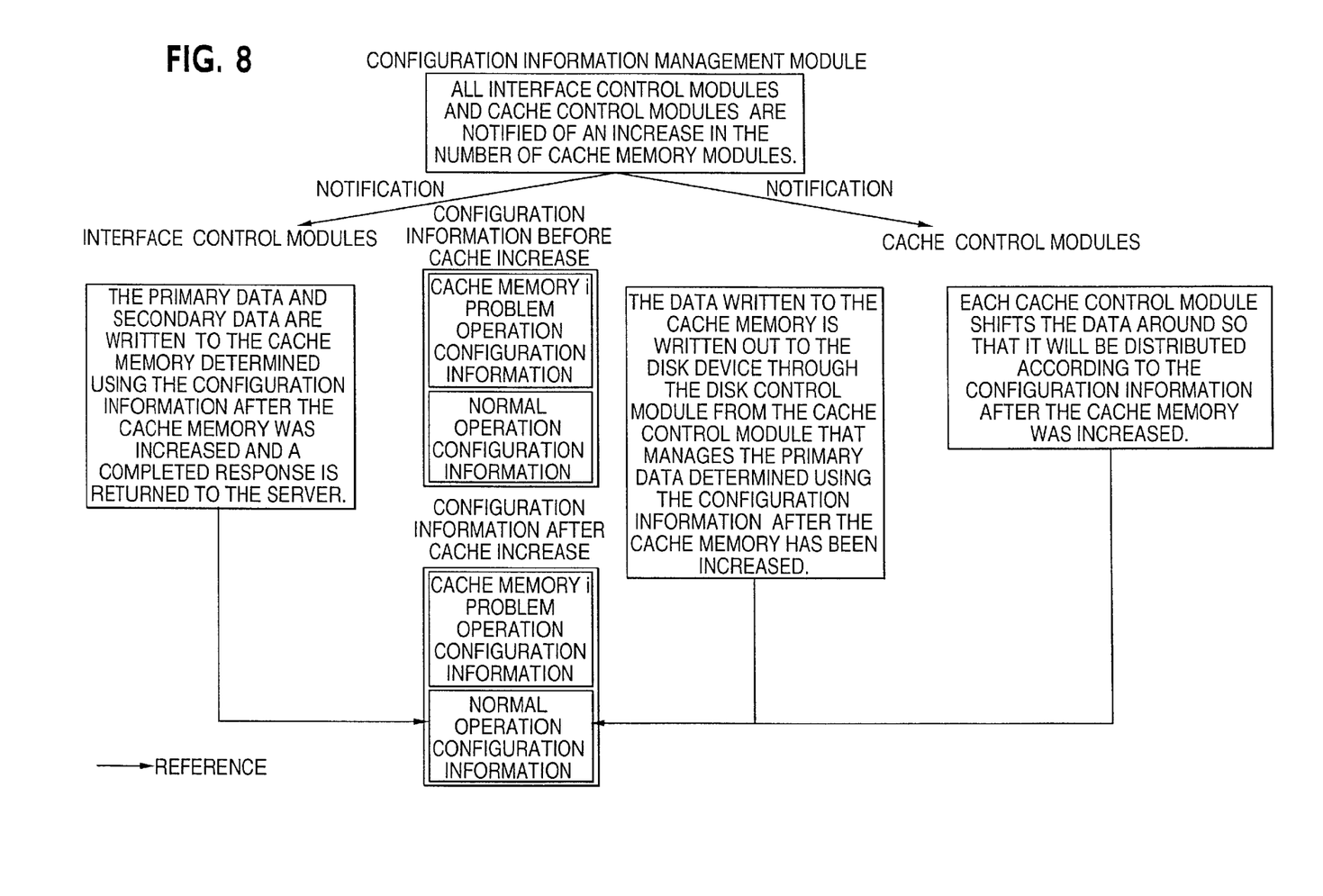
FIG. 8 is a diagram showing the process flow when the number of cache memory modules is increased.

FIG. 6, FIG. 7, and FIG. 8 are flowcharts describing how each of the cache memory modules 12d functions during normal operation (600), when there is a problem with one of the cache memory modules 12d (700), and when the number of cache memory modules 12d is increased (800).

(1) Normal Operation

When all of the cache memory modules 12d are functioning normally, as shown in FIG. 6, the interface control module 12a refers (602) to the normal operation (600)

configuration information 202. When requested by server 11 to write data, the interface control module 12a writes the data (both the primary data and the secondary data) to the cache memory 12d corresponding to the supervisory logical volume 12g determined by the configuration information 202 and returns a completed response to the server 11 (602).

At the same time, during normal operation each of the cache control modules 12c refers to the configuration information and, as shown in FIG. 6, writes out (604) to the disk device 12f, the data that was written to the cache memory modules 12d~12d by the cache control module 12c that manages the primary data determined in the configuration information.

For example, if the logical volume 12g makes a write request in the range of 1~10, the primary data will be written to the cache memory module 12d-1 and the secondary data will be written to the cache memory module 12d2. The primary data written to the cache memory module 12d-1 will be written out to the disk device 12f through the disk control module 12e by the cache control module 12c that manages the primary data. Once the data has been completely written out to the disk device 12f, the above secondary data that was written to the cache memory module 12d-2 will be deleted from the cache memory module 12d-2.

(2) When There is a Problem With the Cache Memory.

When there is a problem with the cache memory 12d–i (when there are three cache memory modules, i=1~3), the configuration information management module 12b notifies (702) all of the interface control modules 12a and all of the cache memory control modules 12c as shown in FIG. 7.

In order to guarantee the permanence of the write data, when the $(i+1)^{th}$ cache control module 12c receives a report about a problem, the cache control module 12c immediately (704) writes data out to the disk device 12f by the disk control module 12e, that is, the primary data held in the cache memory 12d–i where the problem occurred and the secondary data which is in the 12d-$(i+1)^{th}$ cache memory and contains the same data as the primary data. This is as shown in FIG. 7 and as set forth in the configuration information 202 for normal operation 600.

At the same time, when each of the interface control modules 12b are notified of a problem, the interface control modules 12b refer to the configuration information for a problem 700 with the operation of cache memory 12d–i. The interface control modules 12b write (706) the primary data and secondary data to the cache memory 12d determined by the configuration information for a problem 700 with the operation of cache memory i and return a completed response to the server.

The cache control modules 12c (including the $(i+1)^{th}$ cache control module described above) use the configuration information for problems (700) with cache memory 12d–i and write out (708) the primary data, which is managed by the cache control module 12c and written to the cache memory, to the disk device 12f.

If, for example, as shown in FIG. 5 (b), there were a problem with the cache memory 12d-1, the secondary data corresponding to the logical volumes 12g 1 through 10 managed by cache memory 12d-1 which is in cache memory 12d-2, would be immediately written out to disk device 12f through the disk control module 12e.

If the write request from the server 11 is, for example, a write request to the range of logical volumes 12g 1~10, the interface cache memory 12b writes the primary data to the cache memory 12d-2 and the secondary data to the cache memory 12d-3 and returns a completed response to the server 11. Then, based on the configuration information for problem operation, each of the cache control modules 12c would write out to disk device 12f, the primary data written to the cache memory by the cache control module 12c that manages the primary data.

(3) When Increasing the Numb of Cache Memory Modules

In addition to the configuration information 202 before the cache module increase, the configuration information management module 12b includes the configuration information settings beginning when the cache memory 12d was set up (802) and when the amount of cache memory 12d is increased (804). As shown in FIG. 8, the configuration information management module 12b notifies (806) all of the interface control modules 12a and the cache control modules 12c of the increase in the number of cache memory modules 12d.

Also as shown in FIG. 8, each of the cache control modules 12c arranges the data according to the configuration information after the cache memory was set up (804) and then moves (808) the data among the cache memory modules.

Concerning the data written in the cache memory modules 12d, the cache control module 12c, which manages the primary data as set forth in the configuration information 202 after the cache memory is set up, writes (810) out to the disk device 12f through the disk control module 12e.

At the same time, each of the interface control modules 12a, as shown in FIG. 8, write (812) the primary data and secondary data to the cache memory as set forth in the configuration information after the cache memory has been set up (804) and return a completed response to the server 11.

Figure 9:
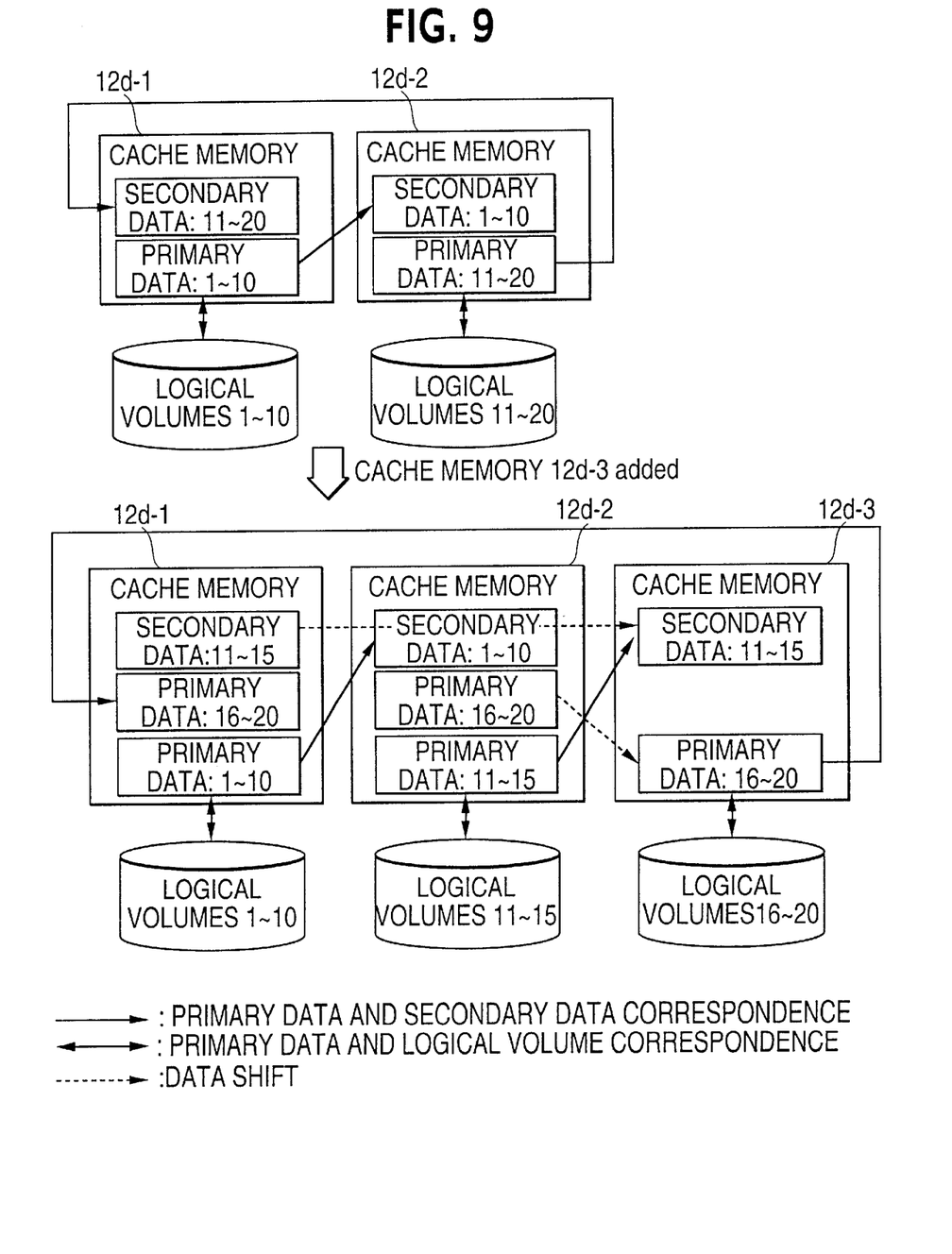
FIG. 9 is a diagram showing the operation when increasing the cache memory.

FIG. 9 shows an operation 900 of the present invention of increasing the number of cache memory modules 12d from two to three.

As shown in the operation 900 of FIG. 9, if the two cache memory modules 12d-1 and 12d-2 are to be increased to three cache memory modules (that is, if cache memory module 12d-3 is being added), all of the interface control modules 12a and all of the cache control modules 12c are notified of the addition of the cache memory 12d-3.

This will cause the cache control module 12c to shift the primary data corresponding to the logical volumes 12g 16~20 of the cache memory 12d-2 to the primary data corresponding to the logical volumes 12g 16~20 of the cache memory 12d-3 as shown by the arrow drawn with a dotted line in FIG. 9. At the same time, the secondary data corresponding to the logical volumes 12g 11~15 of the cache memory 12d-1 will be shifted to the secondary data corresponding to the logical volumes 12g 11~15 of the cache memory 12d-3 3 as shown by the arrow drawn with a dotted line in FIG. 9.

The write back operation that takes place while data is being shifted among these cache memory modules 12d-1, 12d-2, and 12d-3 is, as stated earlier, written out to the disk device 12f through the disk control module 12e by the cache control module 12c that manages the primary data as new configuration information.

That is, the cache control module 12c-1 of the cache memory module 12d-1 of the logical volumes 12g 1~10, the cache control module 12c-2 of the cache memory module 12d-2 of the logical volumes 12g 11~15 and the cache control module 12c-3 of the cache memory module 12d-3 of the logical volumes 12g 16~20 write data out to the disk device 12f through the disk control module 12e. When the write back operation has been completed, the corresponding secondary data is deleted from the cache memory 12d.

The secondary data of the cache memory 12d-2 corresponding to the logical volumes 12g 11~15 is in either the cache memory 12d-1 or the cache memory 12d-3, so the cache control module 12c-2 asks the cache control modules 12c-1 and 12c-3 to delete the secondary data from both the cache memory 12d-1 and the cache memory 12d-3. If there is any secondary data, the secondary data is deleted from the cache memory 12d.

When the interface control module 12a receives a write data request from the server 11, the interface control module 12a writes the write data to the cache memory 12d (for both the primary data and the secondary data) of the supervisory logical volumes 12g determined by the new configuration information and returns a completed response to the server 11.

For example, if there is a write request for the logical volumes 12g in a range of 11~15, the primary data will be written to the cache memory 12d-2 and the secondary data will be written to the cache memory 12d-3.

Effects of the Present Invention

As described above, the present invention includes at least three cache memory modules and duplicates and saves write data while circulating the write data among the three cache memory modules. When there is a problem in the cache memory, the write data that was to be written to a region that was controlled by the cache memory module in which the problem occurred splits the data up among the remaining cache memory modules. This makes it possible to increase cache memory modules in units of one and allows more effective use of cache memory than the conventional hot pair system.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Element Number List 1-1~1-n Cache Memory
2 Disk Devices
3 Cache control modules
11 Server
12 RAID Control Device
12a Interface Control Module
12b Configuration Information Management Module
12c Cache Control Module
12d Cache Memory
12e Disk Control Module
12f Disk Device
12g Logical Volume
100 Hot spare system
101 Subsystem Control Module
101a Memory
101b MPU
101c Bus I/F (interface) Module
102 Cache 1
103 Device Control Module
103a Buffer
103b MPU
103c Memory
103d Bus I/F (interface) control module
104 Device I/F (interface) Module
105 Disk Drive Group
106 Cache X
107 Cache 2
108 Pair
110 Cache 3
112 Cache 4
116 Upper Device
118 Channel I/F (interface) Module
120 Bus
200 RAID control device
202 Configuration information
300 Computer system
400 Computer system

What is claimed is:

1. An input/output control device coupled to one or more disk devices and coupled to and receiving a write request including data from a processing device, said input/output control device comprising:

n (n>2) cache memory modules storing the data upon receiving the write request, wherein said input/output control device transmitting to the processing device a write request complete response, and, asynchronously with transmitting the write request complete response, storing the data from the cache memory modules to the one or more disk devices, wherein the input/output control device dividing the regions of the one or more disk devices into a number of n of the cache memory modules in accordance with configuration information and setting up the configuration information to allocate sequentially primary data and secondary data of the write data, which are written out to a $k^{th}$ region (k=1~n) of a disk device, to the $k^{th}$ cache memory module, and a non-$k^{th}$ cache memory module, respectively.

2. The input/output control device as in claim 1, wherein when the write request is received from the processing device, the primary data and the secondary data that are to be written to the regions of the one or more disk devices are allocated to and stored in the cache memory modules by the input/output control device before returning a write request completed response to the processing device, wherein after the primary data stored in the cache memory modules has been written out to the one or more disk devices, the secondary data is deleted from the cache memory modules.

3. The input/output control device as in claim 1, wherein:

the configuration information is set up by splitting up the regions of the one or more disk devices into the normally functioning cache memory modules m (m<n), sequentially allocating the primary data and secondary data of the write data to be written out to the $k^{th}$ region (k=1~m) of the disk device, to the $k^{th}$ cache memory module, and to the non- $k^{th}$ cache memory module as the configuration information when there is a problem with one of the cache memory modules, when there is a problem with one of the cache memory modules, the secondary data corresponding to the primary data stored in the cache memory module affected by the problem, is immediately written out to the disk device, and using problem operation configuration information, the data is written out to cache memory module in response to the write request from the processing device and the data is also written from the cache memory module to the disk device.

4. The input/output control device as in claim 1, wherein:

after increasing the number of cache memory modules by p, the regions on one or more disk devices are divided into the number of normally functioning cache memory modules p, and the primary data and the secondary data of the data to be written out to the $k^{th}$ region (k=0~p) of the disk are allocated sequentially to the $k^{th}$ cache memory module and the non-$k^{th}$ cache memory module, respectively, and set up as configuration information, and when the number of cache memory modules has been increased, the configuration information set up when the increase was made, is used to shift the data stored in the cache memory modules and then to write out a category to the cache memory modules in response to the write request from the processing device using the configuration information after the increase.

5. The input/output control device as in claim 2, wherein:

the configuration information is set up by splitting up the regions of the one or more disk devices into the normally functioning cache memory modules m (m<n), sequentially allocating the primary data and secondary data of the write data to be written out to the $k^{th}$ region (k=1~m) of the disk device, to the $k^{th}$ cache memory module, and to the non- $k^{th}$ cache memory module as the configuration information when there is a problem with one of the cache memory modules, when there is a problem with one of the cache memory modules, the secondary data corresponding to the primary data stored in the cache memory module affected by the problem, is immediately written out to the disk device, and using problem operation configuration information, the data is written out to cache memory module in response to the write request from the processing device and the data is also written from the cache memory module to the disk device.

6. The input/output control device as in claim 2, wherein:

after increasing the number of cache memory modules by p, the regions on one or more disk devices are divided into the number of normally functioning cache memory modules p, and the primary data and the secondary data of the data to be written out to the $k^{th}$ region (k=0~p) of the disk are allocated sequentially to the $k^{th}$ cache memory module and the non-$k^{th}$ cache memory module, respectively, and set up as configuration information, and when the number of cache memory modules has been increased, the configuration information set up when the increase was made, is used to shift the data stored in the cache memory modules and then to write out a category to the cache memory modules in response to the write request from the processing device using the configuration information after the increase.

7. The input/output control device as in claim 3, wherein:

after increasing the number of cache memory modules by p, the regions on one or more disk devices are divided into the number of normally functioning cache memory modules p, and the primary data and the secondary data of the data to be written out to the $k^{th}$ region (k=0~p) of the disk are allocated sequentially to the $k^{th}$ cache memory module and the non-$k^{th}$ cache memory module, respectively, and set up as configuration information, and when the number of cache memory modules has been increased, the configuration information set up when the increase was made, is used to shift the data stored in the cache memory modules and then to write out a category to the cache memory modules in response to the write request from the processing device using the configuration information after the increase.

8. The input/output control device as in claim 1, further comprising a configuration information management module storing the configuration information.

9. The input/output control device as in claim 1, wherein when the write request is received from the processing device, the primary data and the secondary data that are to be written to the regions of the one or more disk devices are allocated to and stored in the cache memory modules before the input/output control device before returning a write request completed response to the processing device, wherein after the primary data stored in the cache memory modules has been written out to the one or more disk devices, the secondary data is deleted from the cache memory modules.

10. The input/output control device as in claim 1, wherein:

the configuration information is set up by splitting up the regions of the one or more disk devices into the normally functioning cache memory modules m (m<n), sequentially allocating the primary data and secondary data of the write data to be written out to the $k^{th}$ region (k=1~m) of the disk device, to the $k^{th}$ cache memory module, and to the non- $k^{th}$ cache memory module as the configuration information when there is a problem with one of the cache memory modules.

11. The input/output control device as in claim 1, wherein:

when there is a problem with one of the cache memory modules, the secondary data corresponding to the primary data stored in the cache memory module affected by the problem, is immediately written out to the disk device, and using problem operation configuration information, the data is written out to cache memory module in response to the write request from the processing device and the data is also written from the cache memory module to the disk device.

12. The input/output control device as in claim 1, wherein:

after increasing the number of cache memory modules by p, the regions on one or more disk devices are divided into the number of normally functioning cache memory modules p, and the primary data and the secondary data of the data to be written out to the $k^{th}$ region (k=0~p) of the disk are allocated sequentially to the $k^{th}$ cache memory module and the non-$k^{th}$ cache memory module, respectively, and set up as configuration information.

13. The input/output control device as in claim 12, wherein when the number of cache memory modules has been increased, the configuration information set up when the increase was made, is used to shift the data stored in the cache memory modules and then to write out a category to the cache memory modules in response to the write request from the processing device using the configuration information after the increase.

14. The input/output control device as in claim 1, wherein the input/output control device comprises a RAID control device.

15. An apparatus comprising:

one or more disk devices;

a server transmitting a write request including data to be stored in the one or more disk devices; and a control device, coupled to the disk devices and to the server and receiving the write request, comprising:

n (n>2) cache memory modules storing the data upon receiving the write request, wherein said input/output control device transmitting to the processing device a write request complete response, and, asynchronously with transmitting the write request complete response, storing the data from the cache memory modules to the one or more disk devices, wherein the input/output control device dividing the regions of the one or more disk devices into a number of n of the cache memory modules in accordance with configuration information and modifying the configuration information to allocate sequentially primary data and secondary data of the write data, which are written out to a $k^{th}$ region (k=1~n) of a disk device, to the $k^{th}$ cache memory module, and a non-$k^{th}$ cache memory module, respectively.

16. The apparatus as in claim 15, wherein the control device comprises an input/output control device.

17. The apparatus as in claim 15, wherein the one or more disk devices are provided in a RAID configuration and the control device comprises a RAID control device.

18. A method comprising:

storing in n (n>2) cache memory modules of an input/output control device data received in a write request from a processing device;

transmitting by the input/output control device to the processing device a write request complete response, and, asynchronously with transmitting the write request complete response, storing the data from the cache memory modules to one or more disk devices;

dividing by the input/output processing device the regions of the one or more disk devices into a number of n of the cache memory modules in accordance with configuration information; and setting up by the input/output control device the configuration information to allocate sequentially primary data and secondary data of the write data, which are written out to a $k^{th}$ region (k=1~n) of a disk device, to the $k^{th}$ cache memory module, and a non-$k^{th}$ cache memory module, respectively.

19. The method as in claim 18, further comprising:

when the write request is received from the processing device, allocating to and storing in the cache memory modules by the input/output processing device the primary data and the secondary data that are to be written to the regions of the one or more disk devices before returning a write request completed response to the processing device; and deleting the secondary data from the cache memory modules after the primary data stored in the cache memory modules has been written out to the one or more disk devices.

20. The method as in claim 18, further comprising:

setting up the configuration information by splitting up the regions of the one or more disk devices into the normally functioning cache memory modules m (m<n), sequentially allocating the primary data and secondary data of the write data to be written out to the $k^{th}$ region (k=1~m) of the disk device, to the $k^{th}$ cache memory module, and to the non- $k^{th}$ cache memory module as the configuration information when there is a problem with one of the cache memory modules, immediately writing out to the disk device when there is a problem with one of the cache memory modules, the secondary data corresponding to the primary data stored in the cache memory module affected by the problem, and using problem operation configuration information, writing the data out to cache memory module in response to the write request from the processing device and writing the data from the cache memory module to the disk device.

21. The method as in claim 18, wherein:

after increasing the number of cache memory modules by p, dividing the regions on one or more disk devices into the number of normally functioning cache memory modules p, and allocating and setting up as configuration information the primary data and the secondary data of the data to be written out to the $k^{th}$ region (k=0~p) of the disk sequentially to the $k^{th}$ cache memory module and the non-$k^{th}$ cache memory module, respectively, and when the number of cache memory modules has been increased, using the configuration information set up when the increase was made to shift the data stored in the cache memory modules and then to write out a category to the cache memory modules in response to the write request from the processing device using the configuration information after the increase.

22. A computer-readable medium storing a program which when executed by a computer, causes the computer to execute the processes comprising:

storing in n (n>2) cache memory modules of an input/output control device data received in a write request from a processing device;

transmitting by the input/output control device to the processing device a write request complete response, and, asynchronously with transmitting the write request complete response, storing the data from the cache memory modules to one or more disk devices;

dividing by the input/output processing device the regions of the one or more disk devices into a number of n of the cache memory modules in accordance with configuration information; and modifying by the input/output control device the configuration information to allocate sequentially primary data and secondary data of the write data, which are written out to a $k^{th}$ region (k=1~n) of a disk device, to the $k^{th}$ cache memory module, and a non-$k^{th}$ cache memory module, respectively.

23. The computer-readable medium as in claim 22, further comprising:

when the write request is received from the processing device, allocating to and storing in the cache memory modules by the input/output processing device the primary data and the secondary data that are to be written to the regions of the one or more disk devices before returning a write request completed response to the processing device; and deleting the secondary data from the cache memory modules after the primary data stored in the cache memory modules has been written out to the one or more disk devices.

24. The computer-readable medium as in claim 22, further comprising:

setting up the configuration information by splitting up the regions of the one or more disk devices into the normally functioning cache memory modules m (m<n), sequentially allocating the primary data and secondary data of the write data to be written out to the $k^{th}$ region (k=1~m) of the disk device, to the $k^{th}$ cache memory module, and to the non- $k^{th}$ cache memory module as the configuration information when there is a problem with one of the cache memory modules, immediately writing out to the disk device when there is a problem with one of the cache memory modules, the secondary data corresponding to the primary data stored in the cache memory module affected by the problem, and using problem operation configuration information, writing the data out to cache memory module in response to the write request from the processing device and writing the data from the cache memory module to the disk device.

25. The computer-readable medium as in claim 22, wherein:

after increasing the number of cache memory modules by p, dividing the regions on one or more disk devices into the number of normally functioning cache memory modules p, and allocating and setting up as configuration information the primary data and the secondary data of the data to be written out to the $k^{th}$ region (k=0~p) of the disk sequentially to the $k^{th}$ cache memory module and the non-$k^{th}$ cache memory module, respectively, and when the number of cache memory modules has been increased, using the configuration information set up when the increase was made to shift the data stored in the cache memory modules and then to write out a category to the cache memory modules in response to the write request from the processing device using the configuration information after the increase.

* * * * *